United States Patent Office 2,819,198
Patented Jan. 7, 1958

2,819,198

COLD-STABLE PESTICIDE SOLUTIONS

Lyle D. Goodhue, Bartlesville, Okla., assignor to Phillips Petroleum Company, a corporation of Delaware No Drawing. Application December 28, 1953
Serial No. 400,811

14 Claims. (Cl. 167—42)

This invention relates to solutions of pesticides which are stable against separation or precipitation of their active ingredient at low temperatures at which, ordinarily, such ingredient will separate, precipitate, or crystallize out from its solution and fall to the bottom of the container in which the solutions may be stored. In one of its aspects, the invention provides a solvent which will form a retaining structure to maintain distributed within the solvent the active ingredient. In another of its aspects, the invention provides a solvent for a pesticide solution which can form a gel-like retaining structure prior to any substantial separation of solid from the solution as its temperature is lowered. Further, the solvent of the invention contains a waxy material capable of forming a colloidal dispersion or gel structure as the temperature of the solvent is lowered.

Thus, the present invention provides a solvent containing a wax or wax-like material capable of solidifying into a structure extending substantially uniformly throughout the body of the solvent, as it is cooled, to retain in a dispersed condition, while the solvent remains at a temperature at which said wax or wax-like material is a solid, solid particles of an active ingredient also dissolved in said solvent, which ingredient will solidify at a temperature below that at which said wax or wax-like material solidifies, said wax or wax-like material retaining its condition upon reheating for a period of time to permit the re-dissolution in the solvent of the said solid particles of said ingredient. Essentially, then, the active ingredient particles, as formed upon cooling of the solution, are entrapped within a structure as set forth and described herein.

It is known that 1,1,1 - trichloro - 2,2 - bis(p-chlorophenyl)ethane, commonly referred to in commercial usage as DDT, is a highly effective insecticide. In applying insecticidal compositions containing DDT, the insecticide is usually dissolved in a suitable carrier liquid such as a hydrocarbon solvent, which is either used as such or is emulsified with water.

The solubility of DDT in hydrocarbon solvents, as would be expected, becomes less as the temperature decreases. One of the difficulties encountered in storing and employing DDT is its tendency to separate or precipitate out of hydrocarbon solutions at low temperatures such as are often encountered in the winter during freight transportation, during storage in unheated warehouses or in applicators exposed to low temperatures. Once the DDT has precipitated from solution and settled to the bottom of the container, it is difficult to redissolve it even at elevated temperatures because of very low diffusion rates of DDT solutions. The ultimate user, especially, is not equipped to accomplish such redissolution.

I have found that difficulty encountered by the separation of DDT which has been discussed can be overcome by dissolving DDT in a solvent containing a wax component capable of forming a definite physical network-like structure within the system.

In the DDT compositions of my invention, the wax component forms a definite structure within the system at a temperature slightly above the saturation point for the DDT dissolved in the hydrocarbon solvent. As temperature continues to) fall, and crystallization of the DDT component takes place, the crystal formed are retained by the wax structure substantially at the place of their formation. When the temperature is again elevated above the saturation point, the crystals of DDT, being dispersed throughout the system in contact with the solvent, redissolve prior to loss of the wax structure.

According to this invention, therefore, there has been provided a solution of an active ingredient, for example, pesticidal ingredient, containing a material which is capable of forming a gel-like structure within said solution to entrap as they are subsequently formed solid particles of active ingredient which, in the absence of said structure, would separate and fall to the bottom of the container of said solution.

The retention of a dispersion of crystals in my invention is not based on viscosity effects, since increase in viscosity only slows down the rate of settling of crystals but does not prevent their eventual deposition at the bottom of the container. The wax structure formed in my composition holds the crystals at or near the place of their formation by physical means, and settling of such crystals does not occur over periods of many months at temperatures well below the saturation temperature.

The exact nature of the network-like structure formed by the wax in hydrocarbon solvents is unknown. It may be a gel structure formed by the gelling of a colloidal dispersion of wax in the hydrocarbons. Or, it may be a structure consisting of wax crystals, dense enough to prevent the free movement of liquid. I do not wish to commit myself as to the exact nature of the structure. For the purposes of my invention, it is sufficient to know only that a structure is formed which prevents the DDT crystals from settling to the bottom of the container.

There are many solvents suitable for the purpose of my invention. Any solvent capable of dissolving DDT in effective quantities can be used, providing that it contains a wax capable of forming the previously described wax structure at a temperature slightly above the saturation point of the DDT. These temperatures in general will be within the range of 20 to 50° F. though they may fall as low as 0°. The solvent may be an aliphatic hydrocarbon, an aromatic hydrocarbon or mixtures of more than one of these. DDT is generally more soluble in aromatic hydrocarbon than in the aliphatic hydrocarbons, and these are especially useful where concentrated solutions of DDT are desired. For most purposes, a 5 to 20 percent solution of DDT based on the total weight of solution is satisfactory, but concentrations up to 40 percent by weight based on the total weight of the solution are sometimes required, and are within the scope of this invention.

The wax may be present in the solvent either as a naturally occurring ingredient of the solvent, as in the case of a petroleum fraction derived from a paraffin base crude oil, or it may be an ingredient which has been added to a solvent that is either free of wax or contains wax in very small amounts. Among the suitable waxes are paraffin, slack wax, scale wax, rod wax, mineral wax, synthetic waxes, ozocerite, ceresin, montan wax, and the like. They can be used singly or as mixtures. The wax content of the hydrocarbon solvent can vary between 0.1 and 6 percent by weight, preferably between 1 and 5 percent, based on the hydrocarbon solvent.

In addition to the wax content, physical properties of the solvents can vary widely. In the case of petroleum hydrocarbon solvents, they can be characterized by API gravities of 10 to 22; COC flash points of 175–500° F., preferably 200 to 500° F., still more preferably 350 to 450° F.; boiling ranges of 400 to 800° F., preferably 500 to 700° F.; and aniline points of 50 to 125° F. preferably 70 to 110° F.

Illustrative of suitable solvents are extracts obtained by treatment of undewaxed lubricating oil stocks derived from paraffin-base crude oils with phenol, furfural, sulfur dioxide-benzene mixtures, and the like, followed by stripping to remove the extracting agent. A solvent of this type is given in Example 1.

Because of variations in outdoor temperatures, it may be desirable to adjust the temperature at which the wax structure forms in any given DDT solution. This can be done by diluting the solution with a substantially wax-free solvent.

There are other pesticides besides DDT which tend to crystallize out of their solutions at low temperatures and to redissolve only with difficulty. Illustrative of such chemicals are the following insecticides: the gamma isomer of 1,2,3,4,5,6 - hexachlorocyclohexane, known commercially as Lindane; 1,2,3,4,10,10 - hexachloro-1,4,4a-5,8,8a-hexahydro - 1,4,5,8 - dimethanenaphthalene, known commercially as Aldrin; 1,2,3,4,10,10-hexachloro-6,7 - epoxy - 1,4,4a,5,6,7,8,8a-octahydro - 1,4,5,8 - di-methanenaphthalene, known commercially as Dieldrin; and 1,1,1 - trichloro - 2,2 - bis(p-methoxyphenyl)ethane, known commercially as Methoxychlor; the following herbicides: (2,4 - dichlorophenoxy)acetic acid and its derivatives such as the esters and salts, known commercially as 2,4-D; (2,4,5 - trichlorophenoxy)acetic acid and its derivatives such as the esters and salts, known commercially as 2,4,5-T; and N-(trichloromethylmercapto)-phthalimide; the fungicides bis(dimethylthiocarbonyl) disulfide and pentachlorophenol; and the germicide cetyl trimethyl ammonium bromide. Such compounds also are within the scope of my invention.

One method of preparing solutions according to the invention comprises dissolving a desired proportion of the active ingredient or pesticide into a desired solvent following which the solution is cooled until separation of the ingredient begins to take place. Then, a wax-like material, as disclosed herein, is selected in an amount and with property such that when it is dissolved into a desired solution of said ingredient in said solvent, it will solidify into a gel-like structure or congealed mass at a temperature which is somewhat higher than the temperature at which the said ingredient separates out as a solid in the solution. Of course, in the preparation of solutions according to the invention, the wax-like material can be added directly to the solution in which some solid has separated following which the entire mixture can be warmed and agitated which makes it ready for use, or for storage as desired.

*Example I*

A clear solution containing 10 percent by weight of DDT was prepared by adding DDT to Philrich 1, a petroleum fraction characterized by the following properties:

| | |
|---|---|
| API gravity at 60/60, ° F | 11.7 |
| Specific gravity at 60/60, ° F | 0.988 |
| Flash point, COC, ° F | 380 |
| Fire point, COC, ° F | 450 |
| Pour point, ° F | +30 |
| Viscosity, SUS at 100, ° F | 490 |
| Viscosity, SUS at 210, ° F | 49.7 |
| Aniline point, ° F | 77 |
| Sulfur, wt. percent | 0.87 |
| Ash, wt. percent | 0.014 |
| Conradson Carbon residue, wt. percent | 0.09 |
| Rostler analyses: | |
| Asphaltenes | 0 |
| Nitrogen bases | 9 |
| First acidaffins | 17 |
| Second acidaffins | 59 |
| Paraffins | 15 |
| Wax content (modified ASTM, D721-44) | 4.9 |
| Color | Dark |

Philrich 1 is obtained by fractionating the topped paraffin-base crude to yield as one of the fractions a stock to be used for the production of an S. A. E. 10 oil. The stock is extracted with phenol, the phenol is stripped from the extract, and the residue is marketed as Philrich 1.

The temperature of the solution of DDT in Philrich 1 was gradually lowered. At 32° F., the solution "gelled." At minus 10° F., which is below the saturation temperature of the DDT solution, microcrystals of DDT had formed throughout the material, giving a slight turbidity to the congealed mass. The material was stored for two months at minus 10° F. At the end of this time, no crystals had settled to the bottom of the container. Upon warming, the micro-crystals dissolved before the congealed mass became liquid.

*Example II*

Two drums of a DDT solution were prepared as in Example I for use in the control of hornflies and lice on cattle. The unused portion of the oil was stored over the winter months at temperatures that were at times below the saturation temperature of the DDT solution. Upon examination in the spring, no cakes of DDT had formed in the bottom of the drums.

*Example III*

A solvent medium for DDT was prepared by adding 1 percent by weight of 250 slack wax to Aromatic Oil No. 3. The wax and oil are described below. A 20 percent by weight solution of DDT in this solvent was cooled gradually until the solution "gelled." The mixture was stored for about a week at minus 8° F. At the end of that time, no crystals had settled to the bottom of the container. Upon warming to room temperature, the congealed mass became liquid.

Aromatic Oil No. 3 is a recycle gas oil obtained as a side stream from the fractionation of an effluent from a thermal cracking unit that was charged with a catalytically cracked fraction. It is characterized by the following properties:

| | |
|---|---|
| Distillation: | |
| IBP | 430 |
| 50% | 590 |
| EP | 675 |
| Specific gravity | 0.9291 |
| API gravity at 60° F | 20.8 |
| Density of liquid at 60° F | 7.7 |
| Aniline point, ° F | 73.0 |
| Flash point, COC, ° F | 200 |
| Pour point | −15 |
| Viscosity, SUS at 100° F | 36.6 |
| Sludging test at 270° F., 48 days: | |
| With 5% Penta percent | 0.02 |
| With 50/50 creosote do | 1.09 |

The sample of 250 slack wax used had the following properties:

| | |
|---|---|
| Oil content, percent | 6 |
| Viscosity, SUS, at 210° F | 117 |
| API gravity at 60° F | 31.4 |
| Flash point, COC, ° F | 565 |
| Fire point, COC, ° F | 610 |
| Color | 7− |
| M. P., ° F | 168 |
| Refractive index, 70° C | 1.4630 |
| Approximate molecular weight | 730 |

The 250 slack wax is obtained by vacuum reducing a paraffin base topped crude to produce a vacuum reduced crude which is then charged to a propane deasphalting unit. One of the products from the deasphalting step is raw 250 stock (about 215 SUS at 210° F.), which is then subjected to phenol extraction. The 250 raffinate (195° SUS at 210° F.) is charged to a propane dewaxing unit. The wax obtained is known as 250 slack wax.

It does not appear that there is occurring in the operation of my invention any chemical reaction. Therefore, it will be obvious to those skilled in the art in possession of this disclosure that it is widely applicable and is, therefore, not to be restricted to any particular "active ingredient." Indeed, while the invention is primarily applicable with interesting results now foremost in mind to the formation of stable pesticide solution, it is clear that the teaching of the invention can be followed to prepare other cold stable solutions. Such other solutions would not necessarily be equivalents because their ingredients or solvents or additives may not be equivalents.

Reasonable variation and modification are possible within the scope of the foregoing disclosure and the appended claims to the invention, the essence of which is that there have been provided cold stable solutions of ingredients in solvents also containing dissolved therein a wax-like material which will, upon cooling of the solution, form a gel-like structure throughout the entire body of the solution before any substantial solidification of said ingredient causing separation of said ingredient from the solution can occur, thereby maintaining any solid ingredient uniformly distributed throughout the said gel-like structure until such time as the said solution is heated above a temperature at which said solidified ingredient is redissolved.

I claim:

1. A normally liquid hydrocarbon solution containing therein dissolved a pesticide ingredient which upon cooling of said solution will become solid and separate from said solution comprising also dissolved therein a hydrocarbon soluble wax in a sufficient proportion that upon cooling of said solution it will form a gel-like structure before an appreciable quantity of said pesticide can separate from the solution, said hydrocarbon being a petroleum solvent having a flash point of at least about 175° F., containing 5–40 weight percent by way of the pesticide based on the entire weight of the solution, and also containing 0.1–6 weight percent of said hydrocarbon soluble wax, the weight of the wax being based upon the weight of the normally liquid hydrocarbon solvent.

2. A solution according to claim 1 wherein said ingredient is a substance selected from the group consisting of gamma isomer of 1,2,3,4,5,6-hexachlorocyclohexane, 1,2,3,4,10,10-hexachloro-1,4,4a,5,8,8a-hexahydro-1,4,5,8-dimethanenaphthalene, 1,2,3,4,10,10 - hexachloro-6,7-epoxy-1,4,4a,5,6,7,8,8a-octahydro - 1,4,5,8-dimethanenaphthalene, 1,1,1-trichloro-2,2-bis(p-chlorophenyl)ethane, 1,1,1-trichloro-2,2-bis(p-methoxyphenyl)ethane, (2,4-dichlorophenoxy)acetic acid, its salts and esters, (2,4,5-trichlorophenoxy)acetic acid, its salts and esters, N-(trichloromethylmercapto)phthalimide, bis(dimethylthiocarbonyl) disulfide, pentachlorophenol, and cetyl trimethyl ammonium bromide and mixtures thereof.

3. A solution according to claim 1 wherein the hydrocarbon soluble wax is a slack wax.

4. A solution according to claim 3 wherein the wax is obtained by vacuum reducing a paraffin-base topped crude, propane deasphalting said reduced crude, obtaining from said deasphalting a hydrocarbon material having a viscosity of the order of about 215 SUS at 210° F., subjecting said material to phenol extraction obtaining a raffinate and subjecting said raffinate to propane dewaxing to obtain said slack wax.

5. A solution according to claim 1 wherein said solvent is an aromatic oil.

6. A solution according to claim 1 wherein the wax is one selected from the group consisting of paraffin wax, slack wax, scale wax, rod wax, mineral wax, synthetic waxes, ozocerite, ceresin, montan wax and mixtures thereof.

7. A solution according to claim 1 wherein the solvent is obtained by extracting undewaxed lubricating oil stocks derived from paraffin-base crude oils with a solvent followed by stripping to remove the solvent.

8. A solution according to claim 1 wherein the ingredient is DDT and a mineral wax is used as said material.

9. A solution according to claim 1 wherein the ingredient is DDT and the said material is a hydrocarbon wax.

10. A solution according to claim 1 wherein 0.1-6 percent by weight of wax is employed, the weight of the wax being based upon the weight of the normally liquid hydrocarbon solvent.

11. A normally liquid hydrocarbon solution of DDT containing 5–40 percent of DDT based upon the entire weight of the solution and 0.1–6 weight percent of hydrocarbon wax based upon the weight of the normally liquid hydrocarbon.

12. A normally liquid hydrocarbon solution of DDT cotnaining 5–40 percent of DDT based upon the entire weight of the solution and 0.1–6 weight percent of hydrocarbon soluble wax based upon the weight of the normally liquid hydrocarbon.

13. A method preparing a final solution of DDT in a hydrocarbon solvent in which the DDT will not settle out even though it becomes a solid when the final solution is cooled which comprises dissolving a desired proportion of DDT in said solvent, cooling at least a portion of the solution thus obtained until the DDT begins to separate as a solid; then adding to another portion of solution thus obtained an effective amount of a hydrocarbon-soluble wax which will solidify into a gel-like structure or mass in the body of said final solution, upon cooling the same, before DDT separates out as a solid.

14. A method of preparing a final solution of DDT in a hydrocarbon solvent in which the DDT will not settle out even though it becomes a solid when the final solution of DDT is cooled which comprises dissolving a desired proportion of DDT in said solvent, cooling the solution thus formed until DDT begins to separate out as a solid, then adding to the solution thus formed an effective amount of a hydrocarbon-soluble wax which will solidify into a gel-like structure or mass in the body of the final solution of DDT before said DDT separates out as a solid whenever the final solution of DDT is cooled, and then causing said hydrocarbon-soluble wax and DDT to dissolve in said solvent by heating the same to form said final solution.

References Cited in the file of this patent

UNITED STATES PATENTS

| | | |
|---|---|---|
| 1,817,227 | Bird | Aug. 4, 1931 |
| 2,416,460 | Smith et al. | Feb. 25, 1947 |
| 2,543,723 | Hillyer et al. | Feb. 27, 1951 |
| 2,543,955 | Boyd | Mar. 6, 1951 |
| 2,658,017 | Marhofer | Nov. 3, 1953 |

OTHER REFERENCES

Hackh's Chemical Dictionary, 3rd ed., 1944.